United States Patent [19]

Oles et al.

[11] Patent Number: 4,737,098

[45] Date of Patent: Apr. 12, 1988

[54] IN-MOLD LABELING APPARATUS

[75] Inventors: Paul M. Oles, York, Pa.; Jean F. Rubie, Waterloo, Belgium

[73] Assignee: Technipack Corporation, York, Pa.

[21] Appl. No.: 850,581

[22] Filed: Apr. 11, 1986

[51] Int. Cl.$^4$ ............................................. B29C 49/24
[52] U.S. Cl. ................................... 425/503; 264/509; 425/504; 425/126 R; 425/532
[58] Field of Search ............... 264/509; 425/503, 504, 425/126 R, 522, 539, 540, 532

[56] References Cited

U.S. PATENT DOCUMENTS

| | | | |
|---|---|---|---|
| 3,292,209 | 12/1966 | Borkmann | 425/126 R |
| 3,324,508 | 6/1967 | Dickinson | 425/126 R |
| 3,657,405 | 4/1972 | Langenecker | 264/89 |
| 3,881,855 | 5/1975 | Farkas | 425/540 |
| 4,355,967 | 10/1982 | Hellmer | 425/503 |
| 4,397,625 | 8/1983 | Hellmer et al. | 425/135 |
| 4,479,770 | 10/1984 | Slat et al. | 425/503 |
| 4,479,771 | 10/1984 | Slat et al. | 425/503 |
| 4,563,148 | 1/1986 | Hasl et al. | 425/503 |
| 4,582,474 | 4/1986 | Ziegler | 425/503 |

Primary Examiner—Jay H. Woo
Assistant Examiner—Timothy W. Heitbrink
Attorney, Agent, or Firm—Thomas Hooker

[57] ABSTRACT

A shuttle-type blow molding machine and in-mold labeling apparatus for placing labels within open mold halves during movement of the mold halves from the blow mold station to the extrusion station.

21 Claims, 3 Drawing Sheets

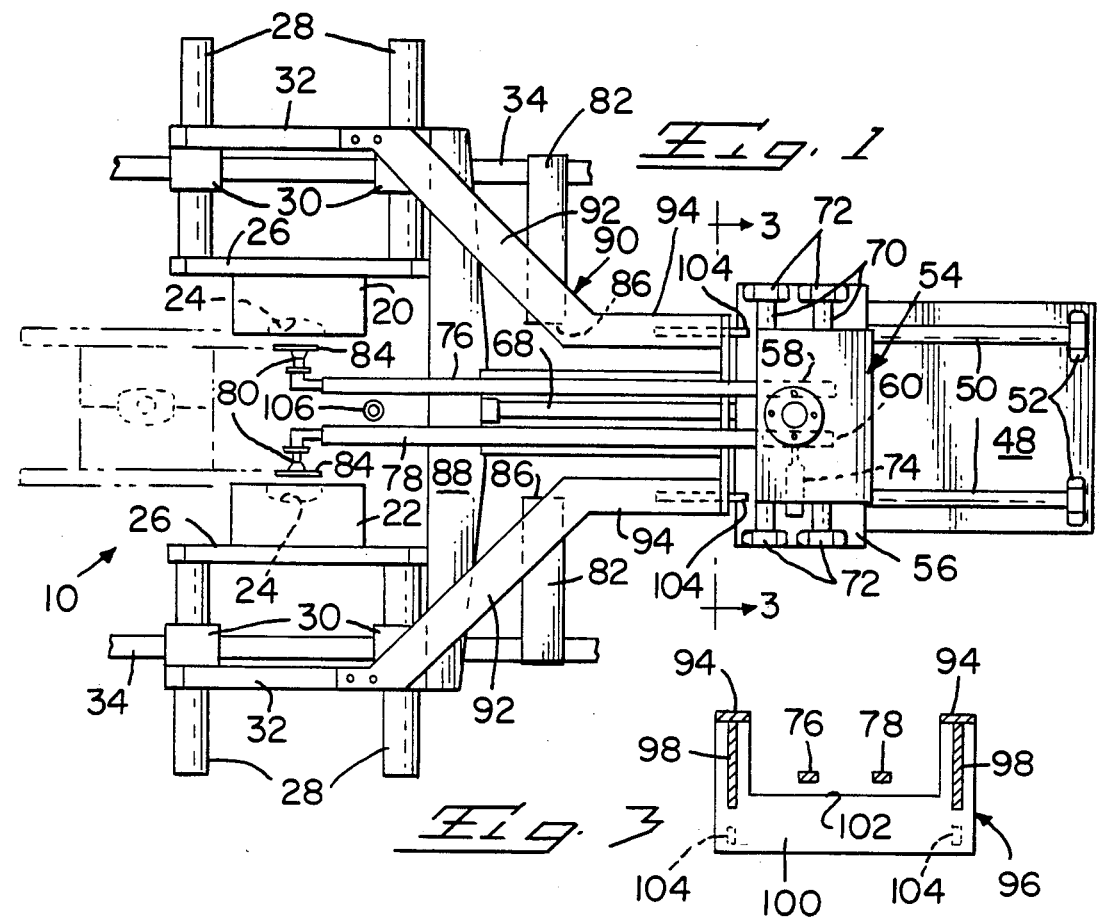
Fig. 1
Fig. 3
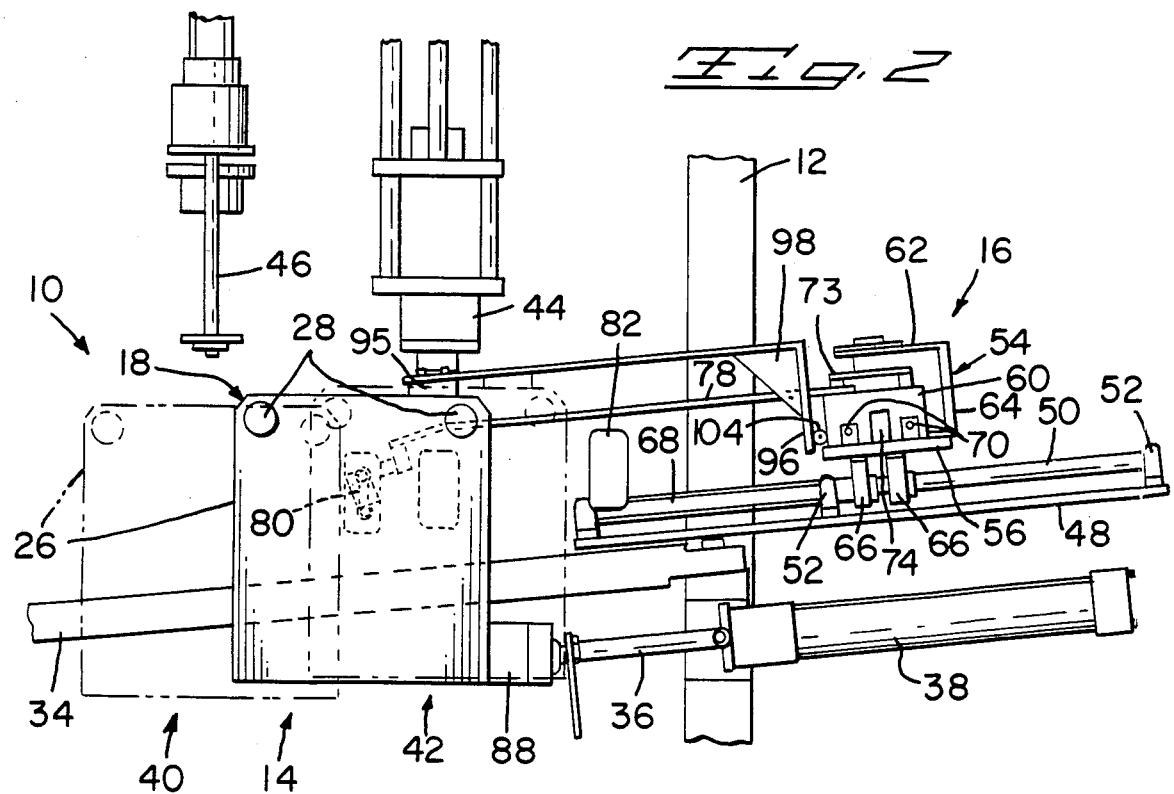
Fig. 2

IN-MOLD LABELING APPARATUS

The invention relates to blow molding of plastic containers with integrally bonded labels and particularly to an improved in-mold labeling machine for placing labels in the recesses of open mold halves during movement of the mold halves toward an extrusion station.

In conventional blow molding machines, open mold halves are moved toward a parison at the extrusion station and closed to capture the parison within the cavity between the mold halves. The closed mold then moves away from the extrusion station to a blow mold station where the captured molten parison is blow molded to expand against the cavity and form the desired container. Following opening of the mold halves and ejection of the blow molded container, the open mold halves are moved back to the extrusion station to capture another length of parison and initiate a new cycle of operation. Blow molding machines are provided with in-mold labeling apparatus operable to pick up labels from label magazines and transfer these labels to the mold recesses of stationary open mold halves before the mold halves close to capture the parison.

The length of the conventional cycle of opertion for blow molding labeled containers is greater than the cycle of operation for blow molding containers without labels, thereby decreasing the rate at which a given machine can manufacture labeled containers below the rate at which the same machine can manufacture unlabeled containers. For instance, in a shuttle-type blow molding machine the length of the interval during which the mold halves are held stationary to receive labels may amount to as much as 5 to 10 percent of the total cycle time. Eliminating this pause would increase the efficiency of the machine.

The disclosed in-mold labeling machine is used to place labels in the mold halves without increasing the cycle time over that for manufacturing unlabeled containers. The machine includes a label transfer assembly having a pair of label transfer heads movable between a retracted position at label magazines located away from the extrusion station and an extended position between the open mold halves as they move toward the extrusion station. The mold halves are mounted on a mold transfer carriage which moves between the blow mold and extrusion stations. A bracket on this carriage extends toward the label transfer carriage and carries a registry plate. This plate engages the extended label transfer carriage to assure that the labels on the transfer heads between the open mold halves are in proper registry with the cavities in the moving open mold halves. During the continued movement of the open mold halves toward the extrusion station registry is maintained, the two carriages move together and the label transfer heads are moved apart to accurately seat the labels within the mold halves.

As the label transfer assembly is pushed by the blow mold assembly, contact between the assemblies and resultant registry between the label transfer heads and the mold recesses is maintained by a force which resists movement of the label transfer assembly and biases the assembly against the plate.

The labels are preferably transferred to the open mold halves before the mold assembly reaches the mold extrusion station. Following the transfer to the mold halves, the label transfer heads are withdrawn from the mold recesses and the label transfer assembly is rapidly moved away from the moving blow mold assembly to assure that the label transfer heads are withdrawn from between the mold halves before the mold halves close on the parison at the extrusion station. In this way, the labels are automatically placed within the recesses of the mold halves during the normal cycle of operation of the blow molding machine.

Other objects and features of the invention will become apparent as the description proceeds, especially when taken in conjunction with the accompanying drawings illustrating the invention, of which there are 3 sheets and one embodiment.

IN THE DRAWINGS

FIGS. 1 and 2 are top and side views respectively of a blow molding machine and in-mold labeling apparatus according to the invention;

FIG. 3 is a sectional view taken along line 3—3 of FIG. 1;

Figure 4:
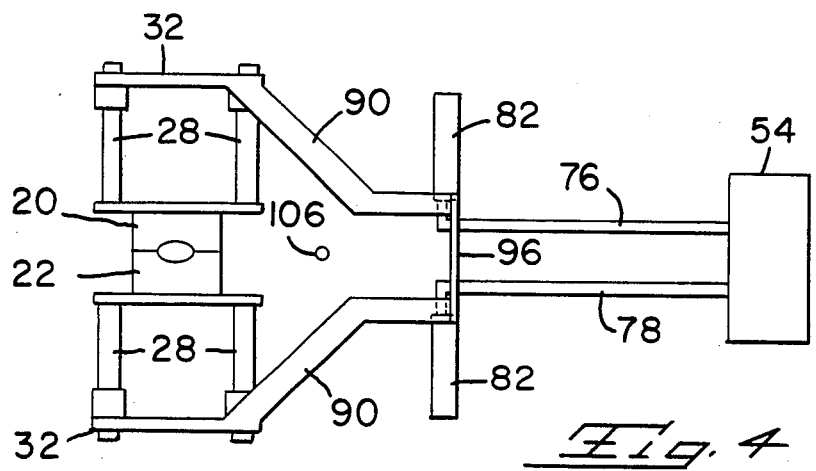
FIGS. 4 through 8 are representational views illustrating the cycle of operation of the machine.

Shuttle-type blow molding machine 10 includes a frame 12, a blow molding assembly 14 mounted on the frame and a label transfer assembly 16 also mounted on the frame immediately to one side of the blow molding assembly 14. Parts of the frame are omitted from the drawings.

The blow molding assembly 14 includes a mold transfer carriage 18 with a pair of blow mold halves 20 and 22. Each mold half is provided with a recess 24 such that when the halves are closed the recesses define a blow mold cavity. A vacuum manifold (not illustrated) in each mold half 20, 22 opens at a plurality of holes formed on the bottoms of the recesses 24 for holding labels within the recesses prior to and during blow molding. The manifolds are connected to a vacuum source throughout operation of machine 10.

The mold halves are mounted on platens 26 which are in turn secured to the ends of slide rods 28. These rods extend through slide bushings 30 on fixed support plates 32. The blow molding assembly includes a drive (not illustrated) for selectively moving the mold halves between open and closed positions as indicated in solid and dotted lines respectively in FIG. 1.

The mold transfer carriage is mounted on a pair of spaced parallel slide rods 34 permanently secured to frame 12. As shown in FIG. 2, piston rod 36 of fluid cylinder 38 is secured to the carriage 18. The cylinder is mounted on frame 12 so that extension of the fluid cylinder positions the mold transfer assembly at blow mold station 40 as shown in FIG. 2 and retraction of the cylinder 38 moves the carriage 18 along the rods to the extrusion station 42. A parison extrusion head 44 is located above the mold halves when at the extrusion station and a blow head 46 is located above the mold halves when at the blow molding station. Slide rods 34 extend downwardly at a shallow angle from the extrusion station to the blow mold station so that movement of the assembly along the rods shifts the mold halves both downwardly and laterally away from the extrusion head 44.

Label transfer assembly 16 is located on the side of adjacent extrusion station 42 away from the blow mold station 40. Assmbly base plate 48 is mounted on frame 12. A pair of spaced, parallel slide rods 50 are mounted on plate 48 in end blocks 52 with the rods 50 extending in a direction toward the extrusion station parallel to rods 34. Label transfer carriage 54 shown in FIGS. 1 and 2 includes a support plate 56 above plate 48, a pair of like slide bodies 58 and 60 and a top plate 62 spaced above plate 56. The top plate is joined to the base plate by support 64.

The label transfer carriage 54 is mounted on rods 50 by means of slide bushings 66 mounted on the lower surface of plate 56. Fluid cylinder 68 is mounted on an extension of plate 48 and includes a piston rod (not illustrated) attached to a bracket on the bottom of plate 56 so that retraction and extension of the cylinder 68 moves the label transfer carriage 54 along rods 50 toward and away from the adjacent extrusion station 42 of blow molding assembly 14.

A pair of spaced parallel slide rods 70 are mounted on the top of plate 56 in end blocks 72. These rods extend perpendicularly to slide rods 50. Rods 70 are located beneath the top plate 62. The slide bodies 58 and 60 carry bushings on rods 70 permitting movement of the slide bodies along the rods. The carriage 54 includes a drive connection 73 on plate 62 joining the two slide bodies 58 and 60. The drive connection may be a double ended arm rotatably mounted on plate 62 with the ends of the arms having slide connections with the slide bodies such that rotation of the arm moves the slide bodies back and forth in opposite directions along the rods 70 between open and closed positions. The piston rod of fluid cylinder 74 mounted on plate 56 is connected to slide body 60 such that extension of the cylinder moves both slide bodies toward each other to a closed position and retraction of the air cylinder moves both bodies to an open position. The movement of body 60 is communicated to body 58 in the opposite direction by the connection 73. The opened and closed positions of the slide bodies are determined by appropriate stops limiting movement of the slide bodies on rods 70.

Like elongate label transfer arms 76, 78 extend from the label transfer carriage 54 toward the extrusion station 42. Arm 76 is bolted to the top of the slide body 50 and arm 78 is similarly bolted to the top of slide body 60. The arms 76 and 78 extend directly toward the blow molding machine, parallel to the axies of slide rods 34 and 50.

A vacuum label transfer head 80 faces outwardly from the free end of each arm 76 and 78. The transfer heads 80 include vacuum cups joined to a vacuum source through suitable vacuum lines and a control valve as more fully pointed out during the description of the operation of machine 10. The heads are formed of plastic to reduce injury to the mold halves in the event the mold halves should accidentally close on the heads.

A pair of like conventional label magazines 82 are mounted on frame 12 between the label transfer carriage and the extrusion station of the assembly 14. Magazines 82 maintain individual labels 84 at pickup locations 86 located equal distances to either side of the arms 76 and 78 and spaced apart from each other the same distance as the bottoms of the blow mold recesses 24 are spaced apart when the mold halves are open. See FIG. 1.

It is contemplated that different types of molds may be used in forming containers using in-mold label machine 10 and, in some cases, the depths of the mold recesses which receive the labels may vary. In order to accommodate molds of different depths, the label magazines 82 are adjustably mounted on frame 12 to assure that the label pickup locations 86 are spaced apart a distance equal to the distances between the bottoms of the mold recesses when the mold halves are open. The open or maximum spacing between the slide bodies 58 and 60 is likewise adjustable to accommodate different depth mold halves and to assure that the slide bodies and label transfer heads 80 move apart a distance sufficient to pick up labels at locations 86 and deposit the labels in the mold recesses.

The mold transfer carriage 18 includes a support arm 88 extending between and joining plates 32. The arm 88 is located below the slide rods 34 supporting the carriage. As indicated in FIG. 2, the piston rod 36 of cylinder 38 is joined to arm 88.

The mold transfer carriage also includes a generally vee-shaped bracket 90, with the legs of the bracket mounted on the tops of the two plates 32. The bracket legs are formed from a metal plate and each include a portion 92 extending inwardly from the plate toward the other leg and a straight portion 94 extending toward the label transfer assembly 16. As indicated in FIG. 2, the bracket legs are mounted on the horizontal tops of plates 32. Angle spacers 95 are provided so that the legs extend from the plates parallel to the axles of slide rods 34 and 50.

The ends of the bracket arms away from plate 32 are joined to a U-shaped registry plate 96 shown in FIG. 3. Plate 96 extends perpendicularly to the bracket arms and to the axies of rods 34 and 50. Gusset plates 98 support the alignment plate on the bracket arms. As shown in FIG. 3, the contact portion 100 of plate 96 is located below leg portions 94 with the label transfer arms 76 and 78 extending through th recess 102 in plate 96 and below the bracket legs. The label transfer assembly 16 carries a pair of contact rollers or stops 104 facing registry plate 96 and engagable with the plate contact portion 100 during movement of the mold transfer carriage from the blow mold station 40 toward the extrusion station 42 as shown in FIGS. 1 through 3.

The operation of machine 10 will now be described. During operation a continuous parison 106 is extruded from head 44, the mold transfer carriage is moved back and forth between stations 40 and 42, the mold halves open and close, capture the parison, and transfer the parison to station 40 where the parison is expanded to form a blow molded container. The labels form integral parts of the blow molded container.

During return movement of the carriage to station 42, the label transfer assembly automatically and accurately places a pair of labels 84 at the bottoms of the mold recesses 24 so that the labels are in place when the carriage returns to the station and the mold halves close and capture the parison. The labels are placed in the mold halves without any pause or dwell time in the cycle of the blow molding assembly.

In FIG. 4 cylinder 38 is extended to position the mold transfer assembly 18 at blow mold station 40 and the molds 20 and 22 are closed about a captured portion of parison 106. In this position the label transfer assembly cylinder is extended so that carriage 54 is retracted to the right along slide rods 50. Cylinder 74 is retracted so that the slide bodies are apart and the label transfer heads are against the labels in magazines 120 at label pick-up positions 86. Vacuum is supplied to the heads to capture the presented lables.

When fluid cylinder 38 is fully extended with carriage 18 at station 40 the blow head 46 is lowered to engage the exposed upper end of the captured parison and compressed air is flowed through the head to expand the parison in the mold cavity and form a container having a shape defined by the shape of the cavity. During blow molding of the parison, the labels are bonded to the sides of the resultant container. Following blow molding head 46 is retracted and the mold halves are opened, the completed container is ejected from between the mold halves and cylinder 38 is retracted to return the carriage 18 toward the extrusion station 42.

Figure 5:
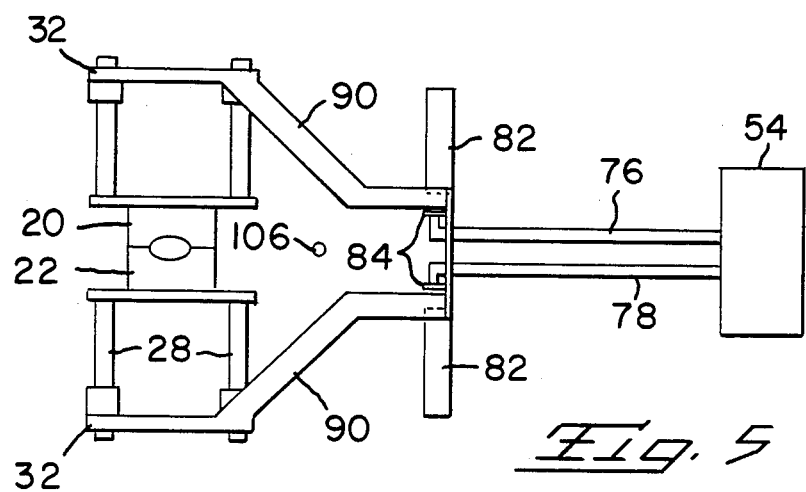

During blow molding, the transfer heads 80 engage the labels in positions 86 during a timing cycles initiated upon movement of the label heads against the labels to assure that the heads capture the labels. Upon this expiration of interval, the cylinder 74 is extended to move the slide bodies 58 and 60, arms 76 and 78 and heads 80 with attached labels from the open to the closed position as shown in FIG. 5. In the closed position, the arms are spaced apart a distance to either side of the parison 106 sufficient to permit movement of the label transfer carriage toward the mold assembly 14 free of the parison as indicated in FIG. 1.

Figure 6:
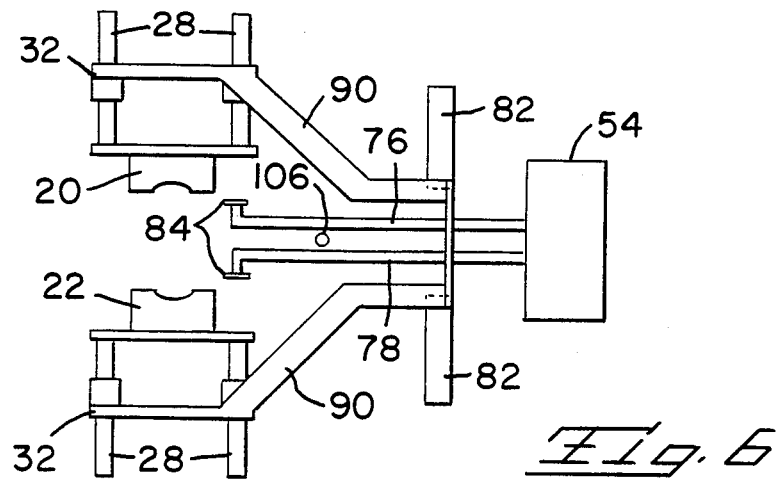

After the label transfer heads have been moved to the retracted position, cylinder 68 is retracted to move label transfer carriage, arms, heads and labels toward the blow molding assembly 14 to the fully extended position as shown in FIG. 6 with the label arms extending past the parison 106 and the labels adjacent the closed mold halves at the blow mold station. In this position, cylinder 68 holds the label transfer carriage 54 against a stop.

Figure 9:
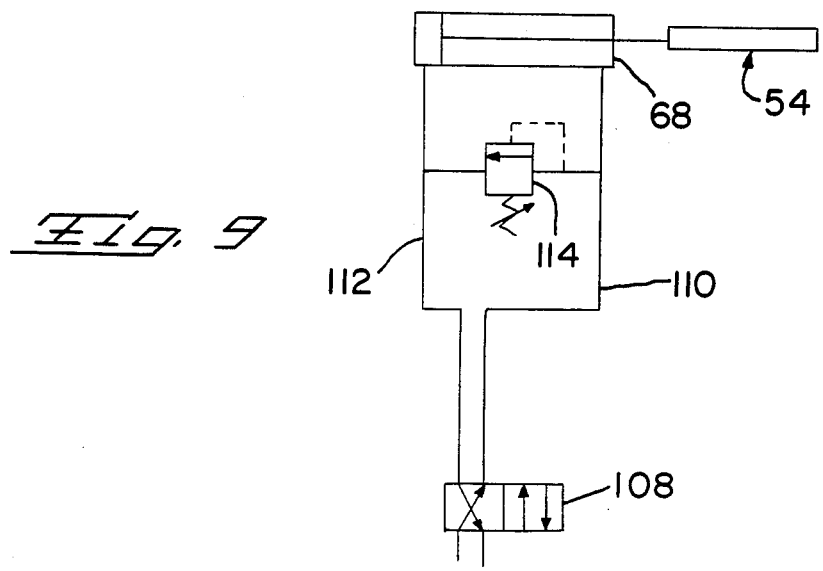
FIG. 9 is a view illustrating a portion of the hydraulic control circuitry of the machine.

Upon completion of the blow molding, opening of the mold halves and ejection of the completed container as shown in FIG. 6, cylinder 38 is retracted to move the open mold halves from the blow mold station toward the extrusion station. As the blow mold carriage moves back along rods 34 toward the extrusion station plate 96 moves toward the label transfer carriage 54 and engages rollers or stops 104 to move the carriage back in the same direction along rods 50. Opposite movement of the label transfer carriage increases the pressure of the hydraulic fluid in circuitry for cylinder 68 as shown in FIG. 9. Before contact between plate 96 and stops 104, high pressure fluid is supplied through control valve 108 and line 110 to the side of the cylinder 68 forcing the cylinder toward the retracted position and biasing the label transfer carriage 54 toward the extended position of FIG. 6. Cylinder line 112 is connected to a low pressure return line by valve 108. A pressure relief valve 114 is connected between lines 110 and 112 and relieves fluid in line 110 to line 112 when the pressure in line 110 exceeds a set pressure above the normal operating pressure.

The registry plate 96 contacts stop 104 and the mold transfer carriage 18 picks up blow mold transfer carriage 16 and moves the carriage with it during the return to the extrusion station 42. The force exerted on the mold transfer carriage by relatively large diameter cylinder 38 is greater than the opposing force exerted on the label transfer carriage by the relatively smaller diameter cylinder 68. Cylinder 68 continues to bias the label transfer assembly against plate 96 thereby maintaining proper registry between the two assemblies during the return stroke of the mold transfer carriage. Initial movement of the label transfer carriage with the mold transfer carriage increases the pressure in line 110 above the set pressure of relief valve 114 to permit the hydraulic fluid displaced by extension of cylinder 68 to flow to low pressure line 112. Valve 108 is not shifted during the return stroke of the label transfer assembly. In this way, the cylinder 68 continues to bias the label transfer assembly against the alignment plate 96 during the return stroke.

The label transfer heads 80 are located a distance from stops 104 so that when the stops are held against plate 96 the transfer heads are in alignment with the mold recesses 24 of open mold halves 20 and 22. The biasing force provided by cylinder 68 during return movement of the mold and label transfer carriages maintains alignment of the heads with the cavities.

Figure 7:
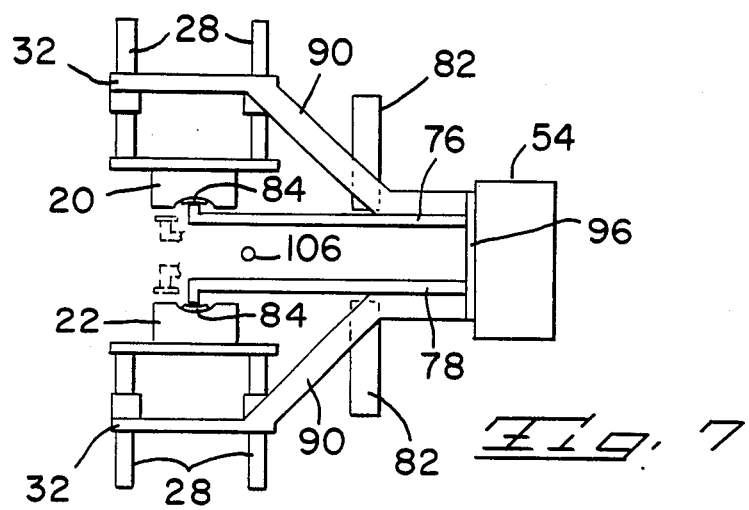

Immediately following registry between the label transfer carriage and moving mold transfer carriage the cylinder 74 is retracted to move the label transfer heads apart and seat the labels in the mold recesses 24 of the mold halves 20 and 22 during movement back toward the extrusion station 42. See FIG. 7.

The label transfer heads are maintained in the open position with the labels held against the recesses 24 for a timing cycle sufficient to assure that the labels are picked up and held against the mold halves vacuum manifolds. At the expiration of the timing cycle the vacuum is removed from the transfer heads and cylinder 74 is extended to withdraw the heads from the recesses. When the heads are fully retracted, valve 108 is reversed and cylinder 68 moves the label transfer carriage 54 to the right as shown in FIGS. 1 and 2 at a rate faster than the rate of movement of the mold transfer carriage so that the arms 76 and 78 and head 80 are withdrawn from between the mold halves before the mold halves reach the extrusion station 42.

Figure 8:
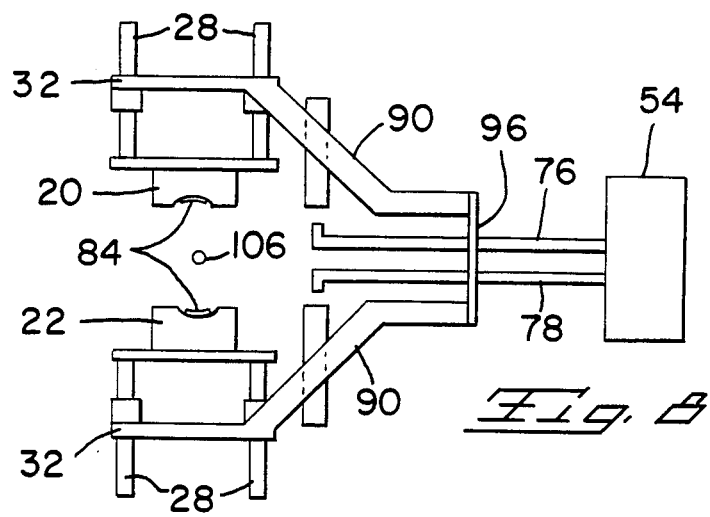

FIG. 8 illustrates the position of the label and mold carriages when the label carriage with open mold halves has been returned to the extrusion station. At this time, the normal cycle to operation of blow molding assembly 14 recommences and the molds close to capture the parison, cylinder 38 is extended to move the mold assembly back to the blow station 40, the captured parison is severed from the extrusion head 44 and cylinder 74 is again retracted to move the label transfer head against the labels held in the pick up positions 86. Vacuum is reconnected to the heads to permit capture of the labels and the cycle of operations is finished.

In the cycle of operation, the labels are accurately and reliably positioned in the mold halves during movement of the mold transfer carriage from the mold station to the extrusion station without lengthening the normal operating cycle of the machine. The cycle time for manufacture of a labeled blow-molded bottle is decreased over that of conventional blow molding machines where movement of the molds is stopped for an interval during which labels are placed in the mold cavities.

The label transfer assembly 16 is described in connection with a shuttle-type blow molding machine 10 where the blow mold assembly moves back and forth along a straight path between the extrusion and blow molding stations. It is contemplated that a label transfer assembly may be used in other types of blow molding machines to place labels in mold halves as they move through a normal cycle of operation. For instance, a label transfer assembly may be used to place labels in moving mold halves where the mold halves are returned to the parison station along either straight or curved paths. Also, the label transfer assembly may be used on rotary type blow molding machines where blow mold assemblies are continuously rotated past a number of stations and are not shuttled back and forth in opposite directions along a single path. It is also contemplated that the invention may be used to place a single label in a mold cavity and to place one or more labels simultaneously in a plurality of mold cavities in case the blow molding machine simultaneously blow molds a plurality of containers.

While we have illustrated and described a preferred embodiment of my invention, it is understood that this is capable of modification, and we therefore do not wish to be limited to the precise details set forth, but desire to avail myself of such changes and alterations as fall within the purview of the following claims.

What we claim as our invention is:

1. A blow molding machine for manufacturing labeled plastic containers; the machine including a parison extrusion head at an extrusion station; a pair of mold halves having recesses defining a blow mold cavity when the mold halves are closed; first drive means for opening and closing the mold halves; second drive means for moving the mold halves when open toward the extrusion head so that the mold halves capture the parison when said mold halves are closed by the first drive means; a first label transfer head; a fixed label magazine spaced from the mold halves; and head drive means for moving the label transfer head between the label magazine and the mold halves when open, for moving the label transfer head toward the extrusion station with one open mold half, and for placing a label carried by the label transfer head in the recess of said one open mold half while the mold halves and the label transfer head move together toward the extrusion station.

2. A machine as in claim 1 wherein the head drive means is fixedly mounted away from the mold halves.

3. A machine as in claim 2 including registry means for moving the label transfer head with the mold halves during transfer of a label from the head to the recess.

4. A machine as in claim 3 wherein the registry means includes a device for locating the label transfer head in spaced alignment with the recess in the moving mold half and for maintaining such alignment during transfer of a label from the label transfer head to the recess.

5. A machine as in claim 4 wherein the mold halves and the label transfer head move along the same path during transfer of a label to the recess.

6. A machine as in claim 5 wherein the device includes a physical connection between the mold halves and the label transfer head so that the mold halves and the label transfer head move together during label transfer.

7. A machine as in claim 6 wherein the head drive means includes means for breaking the connection and withdrawing the label transfer head from between the moving open mold halves after transfer of a label to a recess in a mold half has been completed and before the mold halves close to capture a parison.

8. A machine as in claim 7 wherein said connection is formed by an abutment of a first registry member movable with the mold halves and a second registry member movable with the label transfer head.

9. A machine as in claim 8 including means for biasing the registry members together during label transfer.

10. A machine as in claim 9 wherein the mold halves move toward the extrusion station along a straight path.

11. A machine as in claim 9 including a second label transfer head like said label transfer head and wherein the head drive means positions both label transfer heads between the open mold halves for transfer of labels to both mold recesses.

12. A blow molding machine for manufacturing labeled contaianers including:
   A. A parison extrusion head located at an extrusion station;
   B. A mold transfer assembly comprising:
      1. A mold transfer carriage,
      2. A pair of mold halves on the mold transfer carriage with recesses defining a mold cavity when the mold halves are closed,
      3. First drive means for moving the mold halves between opened and closed positions, and
      4. Second drive means for moving the mold transfer carriage along a first path toward the extrusion station while the mold halves are open to surround a parison extending from the extrusion head so that the mold halves capture a parison when closed;

C. A pair of spaced label magazines located away from the first path;

D. A label transfer assembly comprising:
1. A label transfer carriage,
2. A pair of label transfer heads supported by the label transfer carriage,
3. Third drive means for moving the label transfer carriage back and forth along a second path between an extended position where the label transfer heads are located on the first path a distance away from the extrusion station and a retracted position where the label transfer heads are adjacent the label magazines, and
4. Fourth drive means for moving the label transfer heads between open and closed positions for pick up of labels from the label magazines and placing of labels carried by the heads in the mold halves recesses; and E. Registry means for moving the label transfer heads from the extended position on the first path with the open mold halves whereby fourth drive means opens the label transfer heads and transfers labels carried by the heads to the recesses of the moving mold halves.

13. A machine as in claim 12 including a blow head located at a blow mold station on the first path and wherein the second drive means moves the mold transfer carriage back and forth along such path.

14. A machine as in claim 12 wherein the registry means includes a physical connection between the mold transfer carriage and the label transfer carriage whereby said second drive means moves both the mold halves and label transfer heads together along the first path toward the extrusion station during transfer of labels from the label transfer heads to the mold recesses.

15. A machine as in claim 14 wherein the third drive means breaks the connection and withdraws the label transfer heads from between the moving open mold halves after transfer of labels to the mold recesses has been completed and before the mold halves close to capture a parison.

16. A machine as in claim 15 wherein the first path is located on one side of the extrusion station, the second path is located on the opposite side of the extrusion station, the label transfer assembly comprises a pair of elongate arms projecting from the label transfer carriage toward and beyond the extrusion station when the label transfer carriage is extended with the arms passing to either side of a parison extended from the extrusion head, free ends on the arms the label transfer heads are secured to the free ends of the arms and face outwardly therefrom, said fourth drive means comprising a drive on the label transfer carriage for moving the arms toward and away from each other to move the label transfer heads between the open and closed positions, said magazines being located between the extrusion head and the label transfer carriage.

17. A machine as in claim 15 wherein said first and second paths are straight and parallel each other.

18. A machine as in claim 17 wherein said registry means includes a first registry member on the mold transfer assembly and a second complimentary registry member on the label transfer carriage, said members facing each other whereby when the label transfer carriage is in the extended position the second registry member is in the path of movement of said first registry member during movement of the mold halves along the first path toward the extrusion station so that as the transfer carriage moves toward the extrusion station the members contact each other to establish said connection and the blow mold carriage picks up and moves the transfer carriage with it toward the extrusion station, said carriages being spaced apart when the members are in contact so that the label transfer heads are aligned with their respective mold half recesses for label transfer.

19. A machine as in claim 18 wherein the mold transfer carriage includes a bracket extending toward the label transfer carriage, said first registry member comprises a registry plate on the end of the bracket facing the label transfer carriage and located between the extrusion station and such carriage and said second registry member comprises a contact on the label transfer carriage.

20. A machine as in claim 19 wherein the registry plate and contact are located below said arms.

21. A machine as in claim 18 wherein said third drive means comprises a fluid cylinder connected to the label transfer carriage, and including a hydraulic control circuit for the cylinder having a flow control valve for selectively directing operating pressure hydraulic fluid to the cylinder through a first hydraulic line and returning hydraulic fluid from the cylinder through a second hydraulic line, said lines joining the valve and cylinder, depending upon the position of the valve, and a pressure relief valve joining said lines and having a set pressure above the operating pressure of the hydraulic fluid such that upon establishment of said physical connection and movement of the label transfer assembly with the mold transfer assembly the pressure of the hydraulic fluid in said one line exceeds the operating pressure and the pressure relief valve opens to flow hydraulic fluid to the other line while the cylinder biases the second registry member against the first registry member to maintain alignment between the label transfer heads and the mold half recesses during label transfer.

* * * * *